(12) United States Patent
Garrard et al.

(10) Patent No.: US 9,401,630 B2
(45) Date of Patent: Jul. 26, 2016

(54) COOLING STATOR WINDINGS OF AN ELECTRIC MACHINE

(71) Applicant: EcoMotors, Inc., Allen Park, MI (US)

(72) Inventors: Tyler Garrard, Buellton, CA (US); Will Robert Nielsen Hippen, Eureka, CA (US); Christopher Meszaros, Brighton, MI (US); Diana Brehob, Dearborn, MI (US)

(73) Assignee: EcoMotors, Inc., Allen Park, MI (US)

( * ) Notice: Subject to any disclaimer, the term of this patent is extended or adjusted under 35 U.S.C. 154(b) by 536 days.

(21) Appl. No.: 13/974,287

(22) Filed: Aug. 23, 2013

(65) Prior Publication Data

US 2014/0056726 A1 Feb. 27, 2014

Related U.S. Application Data

(60) Provisional application No. 61/692,726, filed on Aug. 24, 2012.

(51) Int. Cl.
*F02B 39/10* (2006.01)
*H02K 9/19* (2006.01)
(Continued)

(52) U.S. Cl.
CPC .. *H02K 9/19* (2013.01); *H02K 1/20* (2013.01); *H02P 29/00* (2013.01); *H02P 29/0055* (2013.01); *F02B 37/10* (2013.01); *F02B 39/10* (2013.01); *H02K 5/128* (2013.01)

(58) Field of Classification Search
CPC .......... F02B 39/10; F02B 37/10; F02B 39/14; F02B 37/04; F02B 39/16; F04D 25/024; F04D 25/0606; F04D 25/06; F04D 25/082; F04D 29/5806; F04D 13/0613; F04D 13/0606; F04D 13/10; F05D 2220/40; F05D 2220/20; F05D 2220/76; Y10T 29/49012; H02K 9/19; H02K 1/20; H02K 5/128; H02K 5/20; H02K 9/00; H02K 5/1285; H02K 5/132; H02K 5/225; H02K 7/14; H02K 3/24; H02P 29/0055; H02P 29/00

USPC .......... 310/52–64, 349, 347, 86, 87; 417/374, 417/407, 423.8, 423.7, 228

See application file for complete search history.

(56) References Cited

U.S. PATENT DOCUMENTS

| 1,871,286 A | * | 8/1932 | Von Kando Kalman ................. H02K 9/197 310/54 |
| 3,090,544 A | * | 5/1963 | Woollenweber, Jr. .. F01D 25/18 184/6.16 |

(Continued)

FOREIGN PATENT DOCUMENTS

| GB | 1077485 | 6/1967 |
| JP | 2008-95650 A | 4/2004 |
| JP | 2011-167045 A | 8/2011 |

*Primary Examiner* — Devon Kramer
*Assistant Examiner* — Jon Hoffmann
(74) *Attorney, Agent, or Firm* — Barnes & Thornburg LLP

(57) ABSTRACT

In an electric machine, there may be lubrication and cooling needs, such as lubricating bearings and cooling coils of the electric machine. When lubricant is used for both, it is desirable to prioritize the lubrication to the bearings. By providing check valves between a pressurized oil manifold and the cooling coils, lubricant is diverted to the coils only when pressure in the system is sufficient to satisfy both lubrication and cooling. In some embodiments, an oil gallery is provided on an outside surface of a back iron of the stator of the electric machine and orifices are provided in the back iron so that oil drips onto the coils of the electric motor. In some embodiments, the current commanded to the electric motor is based on whether or not lubricant (or other coolant) is being provided to the coils.

14 Claims, 5 Drawing Sheets

(51) Int. Cl.
    *H02P 29/00*     (2016.01)
    *H02K 1/20*     (2006.01)
    *F02B 37/10*     (2006.01)
    *H02K 5/128*     (2006.01)

(56) References Cited

U.S. PATENT DOCUMENTS

| | | | |
|---|---|---|---|
| 3,009,544 A | 5/1967 | Woollenweber | |
| 4,786,238 A * | 11/1988 | Glaser | F01D 25/125 415/175 |
| 5,168,706 A * | 12/1992 | Kawamura | F02B 37/005 123/585 |
| 5,605,045 A * | 2/1997 | Halimi | F01D 5/085 310/52 |
| 7,946,118 B2 * | 5/2011 | Hippen | F01M 11/02 184/6.16 |
| 2005/0151429 A1 * | 7/2005 | Taketsuna | H02K 9/197 310/54 |
| 2006/0225419 A1 * | 10/2006 | Prusinski | F01D 25/18 60/605.1 |
| 2010/0034674 A1 * | 2/2010 | Oota | F02M 37/08 417/410.1 |
| 2010/0175377 A1 * | 7/2010 | Hippen | F02B 37/10 60/602 |
| 2010/0215526 A1 | 8/2010 | Saari | |
| 2010/0247343 A1 * | 9/2010 | Shimizu | F01D 25/12 417/410.1 |
| 2011/0140550 A1 * | 6/2011 | Brandl | H02K 5/20 310/57 |
| 2011/0176907 A1 * | 7/2011 | Groves | F01D 25/166 415/1 |

\* cited by examiner

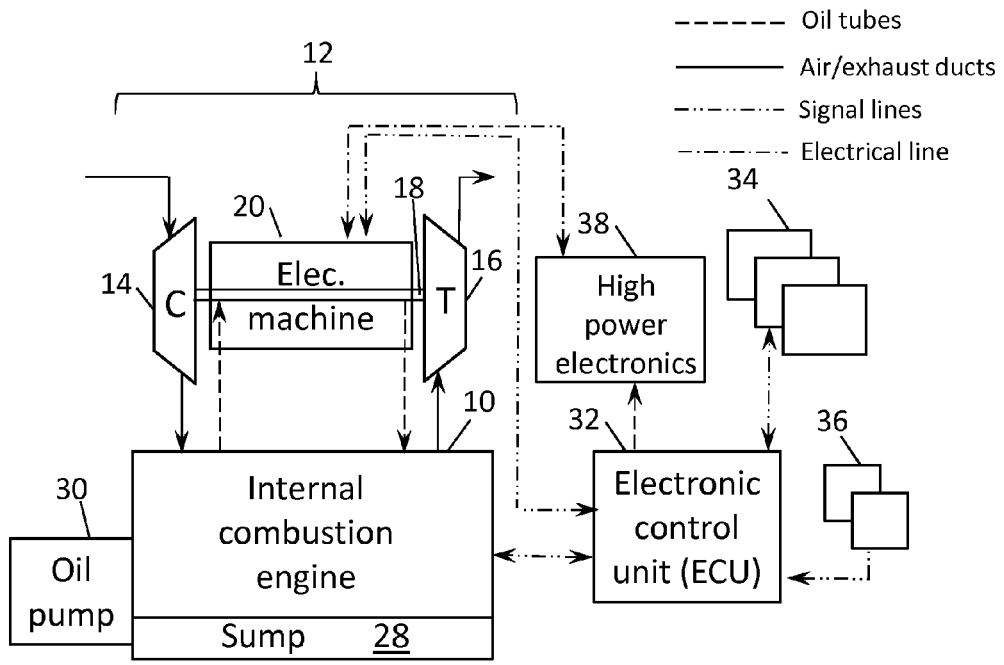
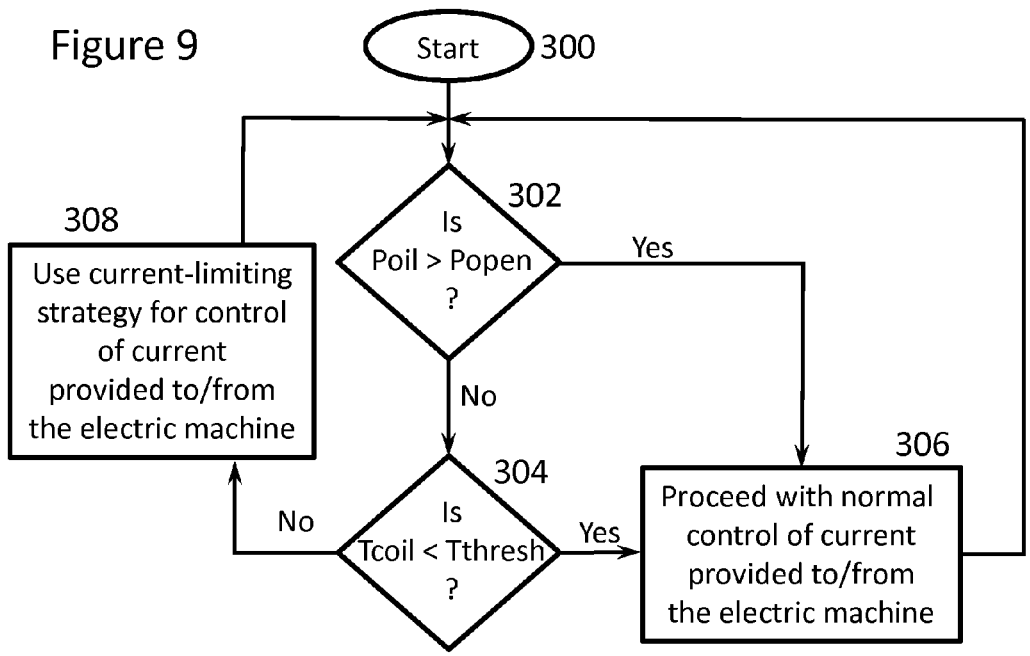

COOLING STATOR WINDINGS OF AN ELECTRIC MACHINE

CROSS-REFERENCE TO RELATED APPLICATIONS

The present application claims priority benefit from U.S. provisional patent application 61/692,726 filed 24 Aug. 2012.

FIELD

The present disclosure relates to cooling electric motors, particularly high-speed motors coupled to turbomachines.

BACKGROUND

The peak performance of an electric machine can be enhanced by effective cooling of windings of the stator. Heat is generated predominantly in the windings of the stator. Eddy currents in the rotor are high, but contribute very little to thermal losses, thus reducing the need for forced cooling. Often a liquid coolant is employed to extract heat from the stator. In conventional electric motors, the coolant may contact the rotor with little consequence. However, in very high speed motors, such as an electric motor coupled to a turbomachine, in which the speeds can approach 350,000 rpm, it is desirable to avoid oil contacting the rotor to avoid high losses due to a high shear rate of the coolant. A system and method to provide liquid coolant onto the windings of the stator, while avoiding coolant contact with the rotor, is sought.

In systems in which the coolant is a lubricant that is also provided to bearings associated with the electric motor or turbomachine, lubrication of the bearings should be maintained at all times during operation to maintain the system's integrity.

If the turbomachine associated with the electric motor operates at high temperature, another contributor to high temperatures in the electric machine is due to heat transfer, primarily radiation, from hot components of the turbomachine to the electric motor.

SUMMARY

To overcome at least one problem in the prior art, an electronically-controlled turbocharger (ECT) is disclosed that includes: a turbine section including a turbine wheel, a compressor section including a compressor wheel, an electric machine including a rotor and a stator, a shaft onto which the turbine wheel, the compressor wheel, and the rotor are affixed, a housing into which the electric machine is mounted, a first bearing mounted between the housing and the shaft proximate the turbine section, a second bearing mounted between the housing and the shaft proximate the compressor section, a pressurized oil supply passage defined in an outer surface of the housing, an oil manifold defined in the housing and fluidly coupled to the pressurized oil supply passage, a first oil passage fluidly coupling the oil manifold with the first bearing, a second oil passage fluidly coupling the oil manifold with the second bearing, and an oil gallery provided between the housing and the stator by forming a groove in one of the housing and an outside surface of a back iron of the stator wherein a third oil passage is provided between the oil manifold and the oil gallery and a plurality of orifices are defined through the stator back iron with one end of the orifices being proximate the oil gallery. The ECT may further include a normally-closed check valve disposed in the third oil passage which opens when pressure in the oil manifold exceeds an opening pressure of the normally-closed check valve. The stator has a plurality of cores comprised of laminations with a plurality of coils wound around the cores. The ECT may further have a first normally-closed check valve disposed in the motor housing wherein an upstream side of the first check valve is fluidly coupled with the oil manifold and a downstream side of the first check valve situated above a first end of one of the plurality of coils and a second normally-closed check valve disposed in the motor housing wherein an upstream side of the second check valve is fluidly coupled with oil manifold and a downstream side of the second check valve situated above a second end of the one of the plurality of coils. The groove to form the oil gallery extends substantially around the entire circumference of the stator with the groove formed in the stator. The groove to form the oil gallery extends substantially around the entire circumference of the stator with the groove defined in the motor housing.

The ECT may further include: a plurality of voids in the stator adapted to collect oil provided to the stator and a drain defined in the motor housing wherein the drain and the voids are fluidly coupled. The housing comprises at least two pieces.

The ECT further includes a power electronics module electrically coupled to the electric machine and an electronic control unit (ECU) electronically coupled to the power electronics module. The ECU determines pressure in the third oil passage and commands the power electronics module to control current in the electric machine according to a normal strategy when the pressure in the third oil passage exceeds an opening pressure of the check valve. In one embodiment, the ECU determines temperature in the stator and the ECU commands the power electronics module to use a current-limiting strategy to control current in the electric machine when both: the pressure in the third oil passage is less than the opening pressure of the check valve and the temperature in the stator is greater than a threshold temperature at which damage of the stator is expected.

Also disclosed is a method to control current commanded to coils of an electric machine which has a liquid cooling passage to provide coolant to the electric machine and a normally-closed check valve disposed in the liquid cooling passage. When pressure on the upstream side of the check valve is below the opening pressure, the check valve remains closed. When pressure on the upstream side of the check valve is above the opening pressure, the check valve opens thereby allowing coolant to flow from the liquid cooling passage to the electric machine. The method includes determining pressure in the liquid cooling passage upstream of the check valve and commanding current to the electric machine using a current-limiting strategy when the pressure in the liquid cooling passage is less than an opening pressure of the check valve. The method further includes determining temperature within the coils of the electric machine and basing the command of the current-limiting strategy to the electric machine additionally on when the temperature within the coils exceeds a threshold temperature. The pressure determination is based on a pressure signal from a sensor in the coolant system. The temperature within the coils is determined at least based on a heat transfer model or, in another embodiment, at least upon a model of the commanded current to the coils and the characteristics of the electric machine including efficiency of the electric machine. When pressure in the liquid cooling passage upstream of the check valve is greater than an opening pressure of the check valve, current commanded to the electric machine is based on a normal operating strategy.

Also disclosed is an electric motor that includes a motor housing, a motor shaft, first and second bearings mounted between the motor shaft and the motor housing, a centrally-located rotor coupled to the motor shaft. A stator contained within the motor housing and concentrically arranged with respect to the rotor, the stator having a plurality of coils wrapped around a plurality of cores that are comprised of a plurality of laminations and a back iron located radially outward of the coils, and a cooling system. The cooling system has a pressurized coolant supply passage defined in the motor housing, a first coolant passage fluidly coupled to the pressurized coolant supply passage, a gallery coupled to the first coolant passage, the gallery provided around at least a portion of the periphery of the back iron with the gallery proximate an outer surface of the back iron, and a plurality of orifices defined in the back iron fluidly coupling the gallery to an inside surface of the back iron wherein oil from the gallery flows through the orifices.

The electric motor additionally has a first normally-closed check valve disposed in the first coolant passage which opens when pressure in the pressurized coolant supply exceeds an opening pressure of the normally-closed check valve; a second normally-closed check valve disposed in the motor housing wherein an upstream side of the second check valve is fluidly coupled with the coolant manifold and a downstream side of the second check valve is situated above a first end of one of the plurality of coils, and a third normally-closed check valve disposed in the motor housing wherein an upstream side of the third check valve is fluidly coupled with the coolant manifold and a downstream side of the second check valve is situated above a second end of the one of the plurality of coils. The gallery is a groove that extends substantially around the entire circumference of the stator with the groove defined in the motor housing. Alternatively, the gallery is a groove that extends substantially around the entire circumference of the stator with the groove defined in the back iron of the stator. Throughout the disclosure the commonly-used term, electric motor, may be used to mean the electric machine, i.e., a device that can be operated both as a motor and as a generator.

An advantage according to an embodiment of the disclosure is that the electric machine is protected by the following measures: lubricant is prioritized to the bearings over cooling the windings of the electric machine and to avoid overheating of the electric machine when insufficient pressure of lubricant is available, a current-limiting strategy can be commanded to the electric machine.

BRIEF DESCRIPTION OF THE DRAWINGS

FIG. 1 is a schematic representation of an engine system having an electronically-controlled turbocharger (ECT);

FIG. 9 illustrates a strategy to control current to the electric machine.

DETAILED DESCRIPTION

Figure 2:
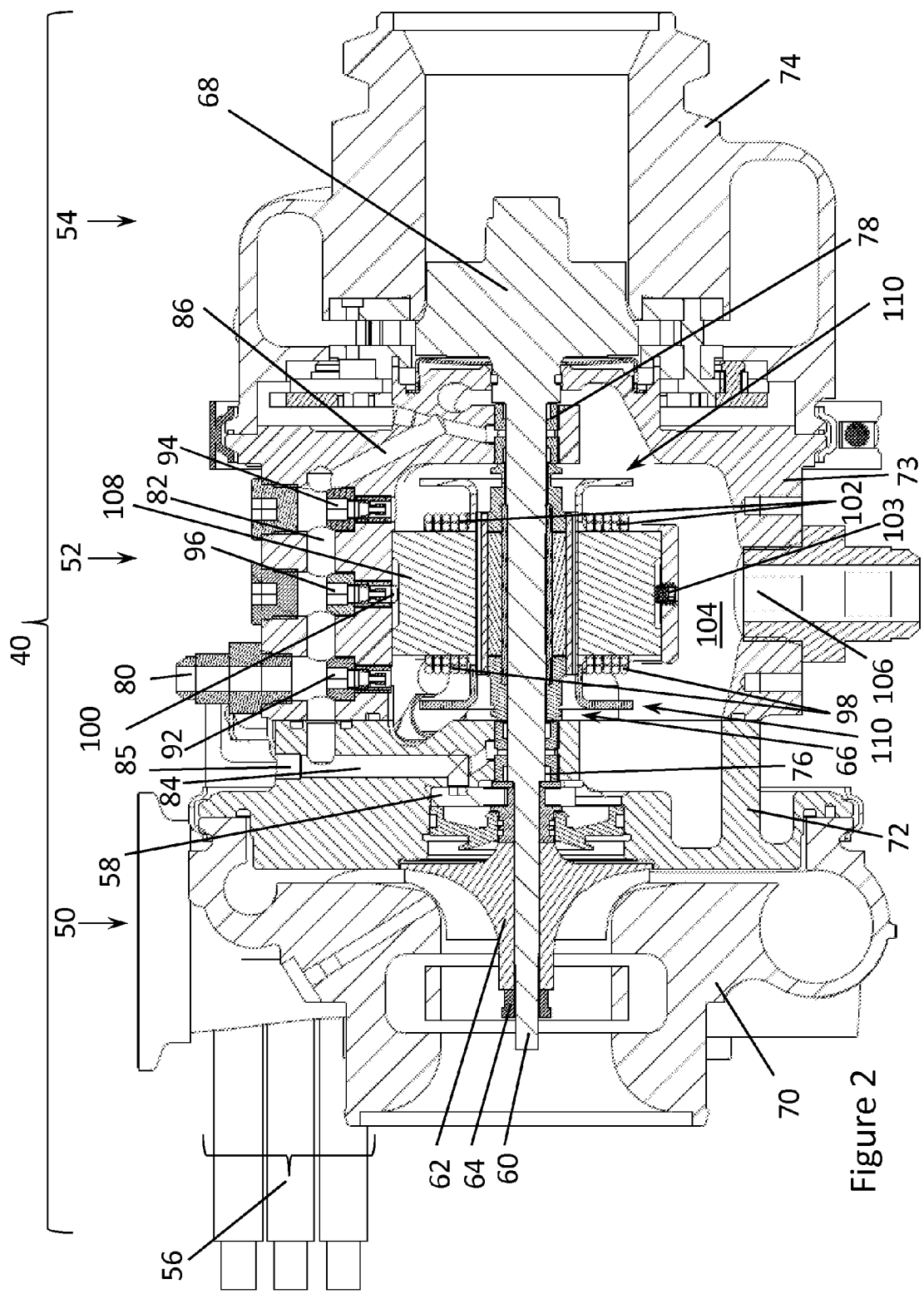
FIG. 2 is a cross-sectional illustration of an ECT.

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

An internal combustion engine 10 having an electronically controlled turbocharger (ECT) 12, a type of turbomachine, is represented schematically in FIG. 1. ECT 12 includes: a compressor 14 that compresses intake gases supplied to engine 10; a turbine 16 that extracts energy from exhaust gases from engine 10; a shaft 18 that couples compressor 14 with turbine 16; and an electric machine (or motor) 20 that drives, or may be driven by, shaft 18.

Engine 10 has an oil pump 30 to lubricate and cool the engine as well as supplying oil to: electric motor 20 and bearings associated with ECT 12 and turbine shaft 16. Oil returning to engine 10 drains to sump 28 wherein it is picked up by oil pump 30 to be pressurized and provided to oil passages in engine 10 and ECT 12.

An electronic control unit 32 receives signals from various sensors 36 and receives signals from and provides signals to various actuators 34. ECU 32 also provides signals to actuators on engine 10 and a power electronics module 38 that provides current to electric motor 20 of ECT 20 and receives signals from sensors on engine 10 and ECT 20 and others. A single ECU 32 is shown; alternatively, distributed computing using a plurality of ECUs is used. For example, sensors 36 may include an oil pressure sensor within engine 10 and/or located at the inlet to ECT 20, a temperature sensor located proximate coils of the electric motor or at an outlet of ECT 20, as examples. Furthermore, based on models of the system, temperatures, pressures, and other parameters can be estimated based on a minimum set of sensor signals and actuator signals. For example, if temperature within the coils of the stator is sought, the flow of oil to the stator for cooling, the temperature of the oil to and from the stator, the current command to the electric machine, and a heat transfer model of the system can be employed to determine the temperature. The present description is one non-limiting example of how a particular temperature, pressure, or other condition can be determined based on a combination of sensor information, actuator information, and a model (or, alternatively, a lookup table).

A cross section of an ECT 40 is shown in FIG. 2. The ECT includes a compressor section 50, an electric machine section 52, and a turbine section 54. Coupled to a common shaft 60 are: a compressor wheel 62 fixed axially by nut 64, a rotor 66 of the electric machine, and a turbine wheel 68 (welded). Alternatively, turbine wheel 68 may be threaded onto shaft 60. Additional detail concerning the components that make up rotor 66 is provided in the description related to FIG. 4. The embodiment in FIG. 2 includes four housing sections that are coupled together: a compressor housing section 70, two electric machine housing sections 72 and 73, and a turbine housing section 74. (In an embodiment without a turbomachine, i.e., just a high-speed electric machine, the housing for the motor may include fewer sections.) Rotating shaft 60 is supported in the housings by bearings 76 and 78. A thrust bearing 58 is provided between the compressor and the housing. An electrical connector 56, which couples with high power electronics (not shown), exits ECT 40.

In the embodiment in FIG. 2, lubricant is used as the coolant for the electric motor. Thus, the lubrication system and the cooling system are integrated. Alternatively, the two systems are separated, which allows different fluids to be used in the systems.

Pressurized lubricant, which is engine oil in one embodiment, is provided to ECT 40 through inlet 80. Oil from inlet 80 fills manifold 82. Manifold 82 is fluidly coupled to oil passages 84 and 86 with passage 84 providing lubricant to bearings 76 and 78 and passage 86 providing lubricant to bearing 78. A plug 85 is provided at the outside end of passage 84 to seal off the drilling to form passage 84.

Manifold 82 is also fluidly coupled to check valves 92, 94, and 96. When pressure in manifold 82 exceeds the opening pressure of the check valve, the check valve opens to allow flow through the check valve. The outlet side of valve 92 directs oil onto a first end 98 of windings of the electric machine; the outlet side of valve 94 directs oil to an oil gallery 100, and the outlet side of valve 96 directs oil onto a second end 102 of the windings. Gallery 100 is shown as a groove in a back iron 108 of the stator. Gallery 100 is contained between housing 72 and a groove in the back iron 108. Alternatively, a groove is provided in housing 72 with the outer surface of back iron 108 being without a groove.

Check valves 92, 94, and 96 ensure that when oil pressure provided to ECT 40 is lower than the opening pressure, that oil is not directed away from bearings 58, 76, and 78. That is, bearings 58, 76, and 78 receive priority lubrication. When pressure in manifold 82 is higher than the opening pressure, there is sufficient pressure in the system to provide cooling to the electric machine without negatively impacting the bearings. In the above discussion, the implication is that the opening pressure in each of check valves 92, 94, and 96 is the same. The opening pressures may be purposely set slightly different so that oil to the bearings is affected in a stepwise fashion. In another situation, the check valve opening pressures may be different due to manufacturing tolerances and effects that come into play during operation, such as deposits forming in the check valve or spring tension in the valves changing over time.

Oil provided to the various components travel to a collector 104 within the housing and drains through a drain hole 106. A shield 110 substantially prevents oil from accessing rotor 66. Shield 110 is provided circumferentially between rotor 66 and the stator (described in more detail below). In the view in FIG. 2, a cross section through a diameter of shield 110, shows an upper and lower portion of the shield; but, the shield extends circumferentially around rotor 66.

Figure 3:
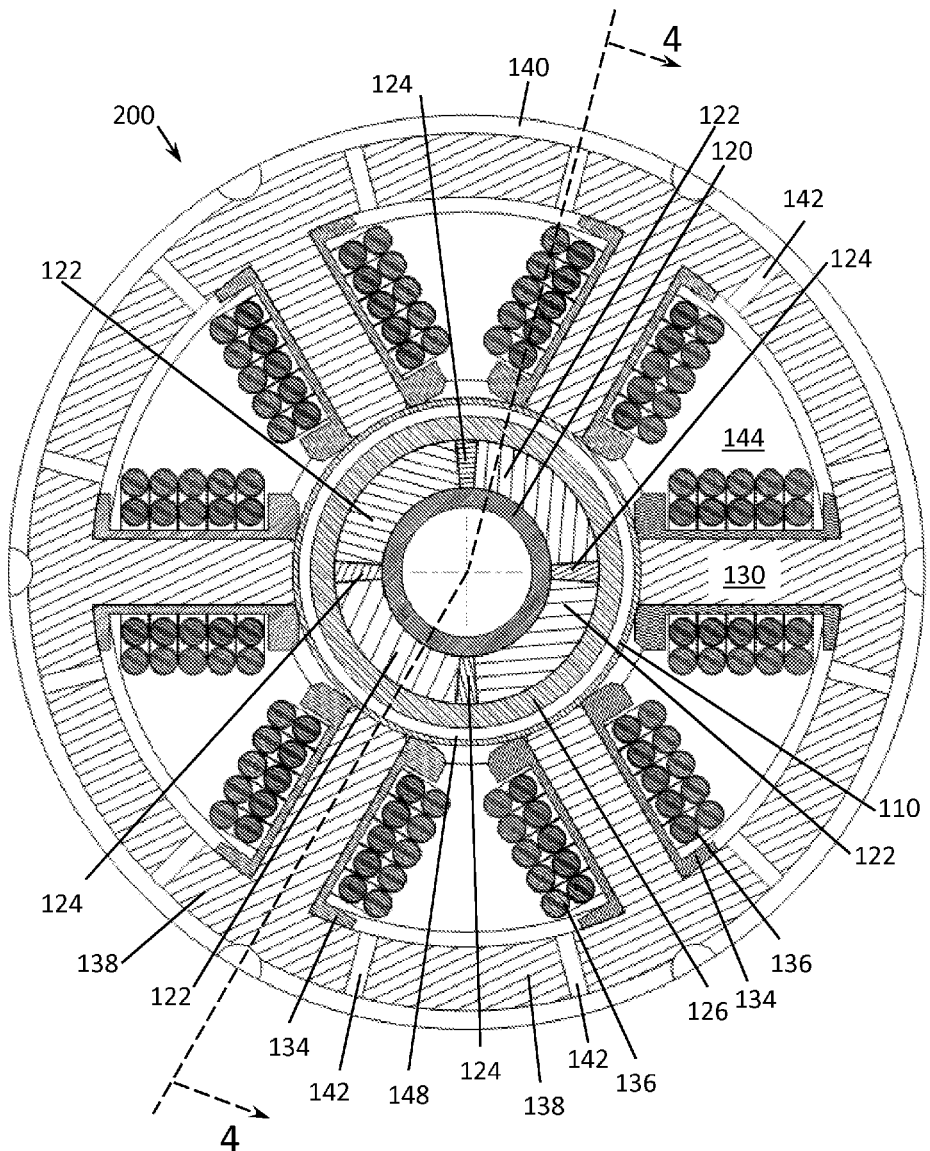
FIG. 3 is a cross sectional illustration of an electric motor associated with an ECT with the cross section taken perpendicular to the axis of the motor.

In FIG. 3, a cross section of the electric motor 200 is shown as taken in a perpendicular direction with respect to the view in FIG. 2. At the center would be the shaft (not shown) surrounded by a stiffener 120. A plurality of magnets 122 (four in the present embodiment) are provided around stiffener 120 with keystone wedges 124 between adjacent pairs of magnets 122. An even number of magnets are arranged radially. A rotor sleeve 126 located exterior to magnets 122 and wedges 124 is provided to contain them. The rotor includes stiffener 120, magnets 122, wedges 124, sleeve 126, and rotor ends caps 128 (only a portion of one rotor end cap is visible in FIG. 3. An air gap 148 separates the rotor and the stator. The stator includes: cores 130 (six in the present embodiment), that are formed out of a plurality of laminations, with bobbins 134 onto which a conductor is wound forming coils 136. The bobbins 134 are provided to simplify assembly of, and to electrically insulate stator coils from motor cores of motor 200; alternatively, the coils are wound directly onto cores or laminations 130. The illustration in FIG. 3, taken as a cross section, does not show the separate laminations that form cores 130. However, this is known to one skilled in the art. The laminations continue through a stator back iron 138. That is, back iron 138 is also formed of laminations; back iron 138 is circumferentially arranged around cores 130. The cores and back iron are comprised of the same laminations and are contiguous with the two separate numerals used to indicate the two sections. A groove in the periphery forms the gallery 140 for oil. Recall that gallery 140 is formed between back iron 138 and the motor housing, the latter of which is not shown in FIG. 3. Orifices 142 are provided in the back iron to allow oil from gallery 140 into voids 144 inside the stator. It may appear from FIG. 3 that oil builds up inside voids 144, but it will become apparent how the oil drains away out of voids 144 in viewing FIG. 4. Shield 110 is provided in air gap 148 to prevent oil within the stator from accessing the rotor. In FIG. 3, orifices 142 appear substantially equal in diameter. Alternatively, orifices 142 are sized to provide a desired quantity of coolant through the various orifices.

Figure 4:
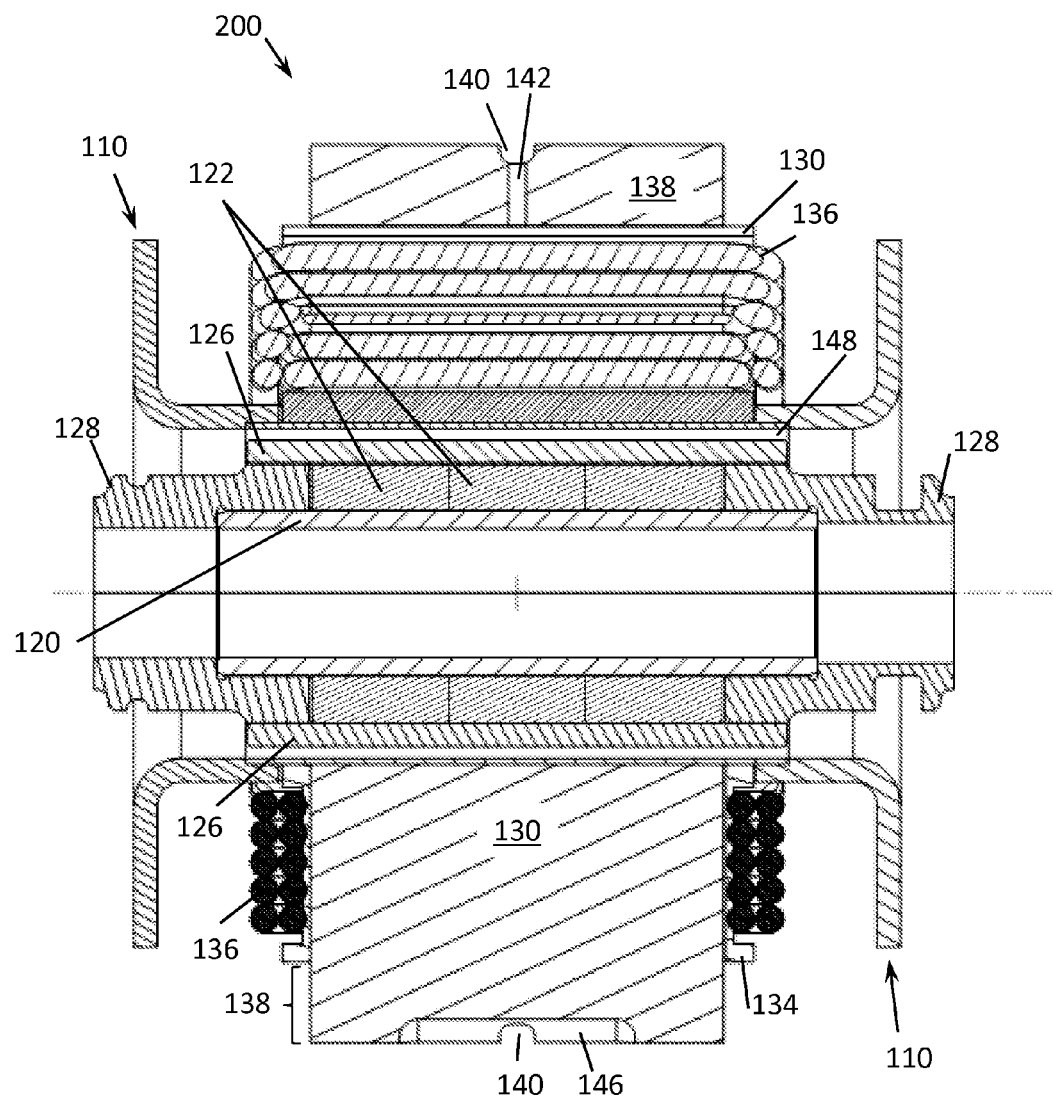
FIG. 4 is a cross sectional illustration of the electric motor taken along the axis of the motor.

FIG. 4 shows a cross section of motor 200 as indicated in FIG. 3. Like elements in FIG. 4 use the same numeral as that used in FIG. 3. The cross-sectional view is not taken through a diameter so that it shows a cross section through windings 136 and an orifice 142. On the lower side, the cross section is taken through cores 130. In the embodiment portrayed in FIG. 4, there are three permanent magnets 122 axially. From FIG. 3, there are four permanent magnets 122, as considered radially. Thus, in the embodiment of FIGS. 3 and 4 have twelve permanent magnets. Magnets that are segmented in an axial direction reduce magnet eddy current losses.

Figure 5:
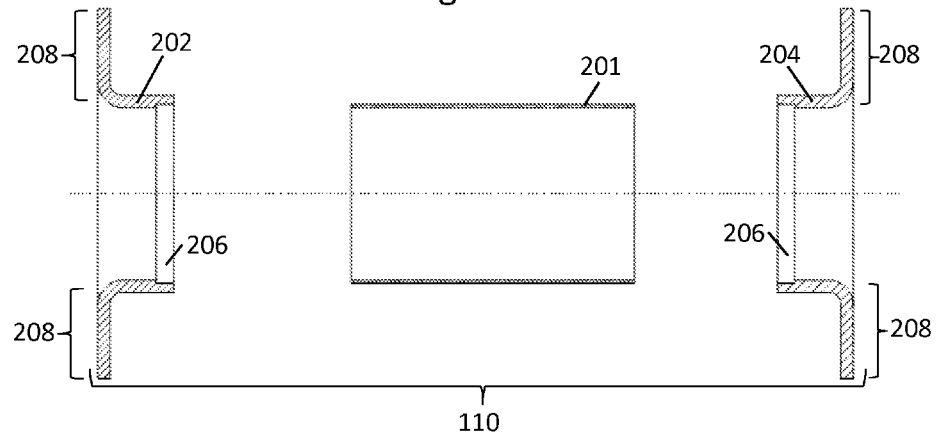
FIG. 5 is a cross-sectional illustration of the shield in an expanded view.
Figure 6:
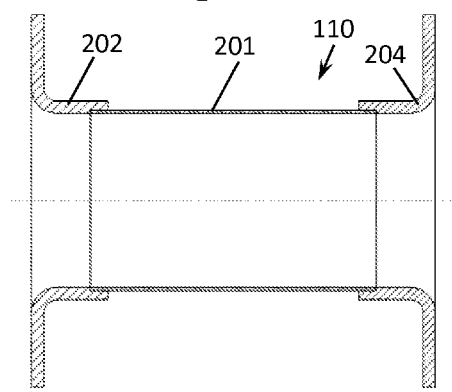
FIG. 6 is a cross-sectional illustration of the shield in an assembled view.

In FIG. 5, shield 110 is shown to include three pieces: a cylindrical sleeve 201 and first and second end caps 202 and 204. In the embodiment in FIG. 5, end caps 202 and 204 are substantially in the shape of bell mouths. However, this is but one non-limiting example. Bell mouths 202 and 204 have a cut back section 206 to present a shoulder to cylinder 201. In all embodiments, shield 110 is made of two parts to allow assembly. In one embodiment, one of the bell mouths is coupled to cylinder 201 prior to insertion into the air gap of the motor or the bell mouth is integrally formed with the cylindrical sleeve 201. The bell mouths 204 each couple to an end of cylinder 201 via any suitable technique, including, but not limited to: gluing, snapping, threading, friction welding, and welding. In an embodiment which uses threads, there are threads in cutback section 206 which engage with threads at the ends of cylindrical sleeve 201 (threads not shown in FIG. 5). An assembled version of shield 110 is shown in FIG. 6.

Turbine section 54 of ECT 40 is provided exhaust gases from an engine, thus consequently runs hot. Energy is dissipated in electric machine 200 (FIG. 4) both when operating as a motor or as a generator. To avoid damaging electric machine 200, the dissipated energy is managed. It is desirable to avoid any radiative or conductive heat transfer to the electric machine from turbine section 54. Bell mouths 202 and 204 serve a dual purpose of preventing oil from dripping onto the rotor and preventing radiative heat transfer from the turbomachine to the electric motor. To improve the insulating characteristics of shield 110, surfaces 208 of bell mouths 202 and 204 are coated with an insulating ceramic or other suitable insulator or reflector. The coating insulates thermally, electrically, or both.

The thickness of cylindrical sleeve 200 is selected to take up as little of the air gap as possible while having sufficient structural integrity. It can be seen in FIGS. 5 and 6 that cylindrical sleeve 200 is much thinner than bell mouths 202 and 204.

Referring to FIG. 3, shield 110 allows oil, under gravitational pull, to move downwardly toward the drain 106, but without contacting the rotor.

Figure 7A:
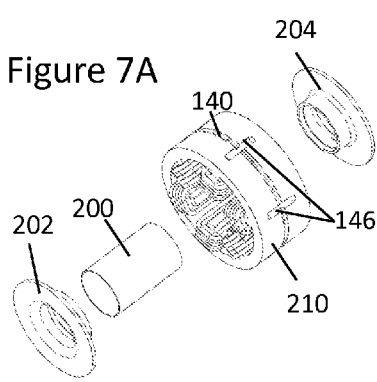
FIG. 7A is an isometric view of the stator of the electric machine and the shield in an expanded view.
Figure 7B:
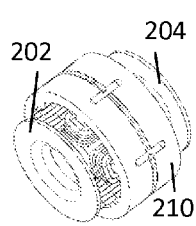
FIG. 7B is an isometric view of the stator of the electric machine and the shield as assembled.

In FIG. 7A, an isometric view of stator 210 and the shield (expanded as cylindrical sleeve 200 and end caps 202 and 204) is shown. The shield and stator are shown in an assembled state in FIG. 7B.

Figure 8:
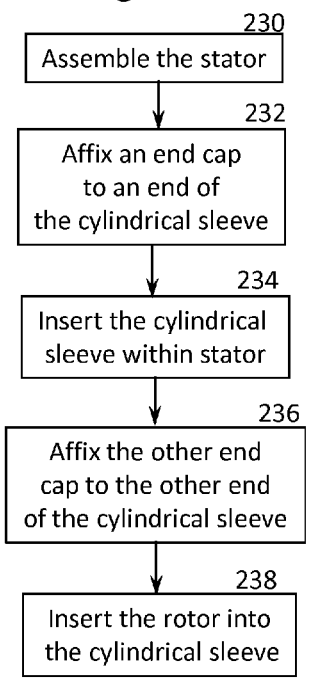
FIG. 8 is a flowchart depicting one embodiment of assembling the shield within the electric machine.

Assembly of shield is shown in a flowchart in FIG. 8. The stator is assembled in 230. One of the end caps is attached to an end of the cylindrical sleeve in block 232. The cylindrical sleeve is inserted though the stator in block 234. The other end cap is attached to the other end of cylindrical sleeve in block 236. The rotor is inserted into the stator in block 238. The operations in FIG. 7 are shown in the preferred order. Blocks 232 and 234 may be performed in the opposite order. In another alternative, blocks 230 and 232 may be performed in the opposite order.

The coolant can be any suitable fluid. In the case of an ECT that is coupled to an internal combustion, engine lubricant is a fluid that is available under pressure to provide to the ECT for both cooling and lubricating purposes. In the embodiment in which lubricant serves as the coolant for the electric machine 20 (FIG. 1), drain 106 (FIG. 2) can be fluidly coupled to sump 28 of engine 10 (FIG. 1).

As described above, lubrication of the bearings is prioritized over cooling the electric machine. For example, at startup, the oil pressure is likely less than that needed to provide oil both for cooling and lubrication and the check valves providing oil to the electric machine are closed. This may, in some situations, coincide with the desire to provide a high current to the electric machine to compress air in the turbomachine. The electric machine can tolerate a high burst of current for a short duration without overheating. However, without additional cooling measures being provided, the duration of such a burst is limited. A strategy to avoid overheating during such a situation in which the check valves are closed starts in block 300 in FIG. 9. In 302 the pressure in the oil system is determined (Poil) and compared to the opening pressure of the check valves (Popen). When the pressure in the oil system is greater, then the check valves are open and control passes to block 306 in which normal control of the current provided to or extracted from the electric machine proceeds. If, however, the pressure in the system is not high enough to open the check valves, control passes to block 204 in which it is determined whether the temperature of the coils (Tcoil) of the electric motor exceeds a threshold temperature (Tthresh). Based on a measurement of temperature in the coils or by a model, the temperature in the coils can be estimated or determined. As long as the temperature in the coils is lower than the threshold, control passed to block 306 for normal control of current. However, if the temperature exceeds the threshold, control passes to block 308, which is an alternative strategy for controlling the current to (or from) the electric machine to protect the electric machine from overheating. In the vast majority of normal operating conditions, the occurrence of insufficient oil pressure to both cool the coils of the electric machine and lubricate the bearings is brief, most likely confined to startup. Nevertheless, it is useful to provide an operating strategy that limits current, such as called for in block 308, to avoid damage of the electric machine during those unusual occurrences.

The ability of the electric motor to provide torque is often limited by the current flux capacity as a result of the temperature that is generated in the coils or windings. Providing cooling to the windings effectively leads to a higher output motor. To that end, liquid cooling is known to be provided onto the windings. For high speed motors, however, the liquid cooling should be kept away from the rotor. The energy dissipated in the rotor is much lower than in the stator; thus, no liquid cooling is needed. In high speed motors, e.g., approaching 350,000 rpm in some ECTs, shearing of the coolant at such high speeds leads to a high frictional load as well as losses as the coolant is atomized into a mist. To keep the coolant from obtaining access to the rotor, a sleeve portion of a shield is placed between the rotor and the stator occupying a portion of the air gap. The shield has a cylindrical section and two bell mouth sections, one on each end. The cylindrical section, which is separated from the permanent magnets by a small air gap, is formed out of a material having low permeability so as to avoid undue interference with the flux lines set up in the motor. The permeability referred to herein relates to electromagnetic permeability. The material may be a polymer, composite, non-ferrous, or any other material with relatively low permeability. As the bell mouths are not within the air gap between the rotor and the stator, the bell mouths may be made of a material substantially without regard to the permeability.

A notch 146, as shown in FIG. 4, is provided in the outer surface of the stator so that a set screw can be engaged with notch 146. The set screw 103 is shown in FIG. 2 (notch is shown in FIG. 2 but not separately called out with a numeral and a lead line) engaged with the notch. See in FIG. 8 that notches 146 are evenly spaced around the periphery of stator 210. Only one of notches 146 engages with set screw 103. However, for proper operation of the electric machine, it is desirable to evenly distribute notches 146 on the outer surface of stator 210 and coordinated with the coils. The notch 146 and set screw 103 serve to counteract the torque generated by the motor. Alternatively, a plurality of set screws can be provided to protect for backing out of any one set screw.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An electronically-controlled turbocharger (ECT), comprising:
    a turbine section including a turbine wheel;
    a compressor section including a compressor wheel;
    an electric machine including a rotor and a stator wherein the stator has a plurality of cores comprised of laminations with a plurality of coils wound around the cores;

a shaft onto which the turbine wheel, the compressor wheel, and the rotor are affixed;

a housing into which the electric machine is mounted;

a first bearing mounted between the housing and the shaft proximate the turbine section;

a second bearing mounted between the housing and the shaft proximate the compressor section;

a pressurized oil supply passage defined in an outer surface of the housing;

an oil manifold defined in the housing and fluidly coupled to the pressurized oil supply passage;

a first oil passage fluidly coupling the oil manifold with the first bearing;

a second oil passage fluidly coupling the oil manifold with the second bearing;

an oil gallery provided between the housing and the stator by forming a groove in one of the housing and an outside surface of a back iron of the stator:

a first normally-closed check valve disposed in the housing wherein an upstream side of the first check valve is fluidly coupled with the oil manifold and a downstream side of the first check valve is situated above a first end of one of the plurality of coils; and a second normally-closed check valve disposed in the housing wherein an upstream side of the second check valve is fluidly coupled with the oil manifold and a downstream side of the second check valve is situated above a second end of the one of the plurality of coils;

wherein a third oil passage is provided between the oil manifold and the oil gallery and a plurality of orifices are defined through the stator back iron with one end of the orifices being proximate the oil gallery.

2. The ECT of claim 1, further comprising:
a third normally-closed check valve disposed in the third oil passage which opens when pressure in the oil manifold exceeds an opening pressure of the third check valve.

3. The ECT of claim 2, further comprising:
a power electronics module electrically coupled to the electric machine; and
an electronic control unit (ECU) electronically coupled to the power electronics module wherein the ECU determines pressure in the third oil passage and commands the power electronics module to limit current in the electric machine when the pressure in the third oil passage exceeds an opening pressure of the third check valve.

4. The ECT of claim 2 wherein an electronic control unit (ECU) determines temperature in the stator and pressure in the third oil passage and the ECU commands a power electronics module to use a current-limiting strategy to control current in the electric machine when both:
the pressure in the third oil passage is less than the opening pressure of the third check valve; and
the temperature in the stator is greater than a threshold temperature at which damage of the stator is expected.

5. The ECT of claim 1 wherein the groove to form the oil gallery extends substantially around the entire circumference of the stator with the groove formed in the stator.

6. The ECT of claim 1 wherein the groove to form the oil gallery extends substantially around the entire circumference of the stator with the groove defined in the housing.

7. The ECT of claim 1 further comprising:
a plurality of voids in the stator adapted to collect oil provided to the stator; and
a drain defined in the housing wherein the drain and the voids are fluidly coupled.

8. The ECT of claim 1 wherein the housing comprises at least two pieces.

9. An electric motor, comprising:
a motor housing;
a motor shaft;
first and second bearings mounted between the motor shaft and the motor housing;
a centrally-located rotor coupled to the motor shaft;
a stator contained within the motor housing and concentrically arranged with respect to the rotor, the stator having a plurality of coils wrapped around a plurality of cores that are comprised of a plurality of laminations and a back iron located radially outward of the coils; and
a cooling system, comprising:
a pressurized coolant supply passage defined in the motor housing;
a coolant passage fluidly coupled to the pressurized coolant supply passage;
a first normally-closed check valve disposed in the motor housing wherein an upstream side of the first check valve is fluidly coupled with the coolant passage and
a downstream side of the first check valve is situated above a first end of one of the plurality of coils; and
a second normally-closed check valve disposed in the motor housing wherein an upstream side of the second check valve is fluidly coupled with the coolant passage and a downstream side of the second check valve is situated above a second end of the one of the plurality of coils.

10. The motor of claim 9, further comprising:
a third normally-closed check valve disposed in the coolant passage which opens when pressure in the pressurized coolant supply exceeds an opening pressure of the third normally-closed check valve.

11. The motor of claim 9 wherein a gallery comprises a groove that extends substantially around the entire circumference of the stator with the groove defined in the motor housing.

12. The motor of claim 9 wherein a gallery comprises a groove that extends substantially around the entire circumference of the stator with the groove defined in the back iron of the stator.

13. The motor of claim 9, further comprising: a gallery provided around at least a portion of the periphery of the back iron with the gallery proximate an outer surface of the back iron.

14. The motor of claim 13, further comprising: a plurality of orifices defined in the back iron fluidly coupling the gallery to an inside surface of the back iron.

* * * * *